(12) United States Patent
Poilane et al.

(10) Patent No.: US 7,698,933 B2
(45) Date of Patent: Apr. 20, 2010

(54) METHOD AND DEVICE FOR ESTIMATING THE TEMPERATURE OF EXHAUST GASES ENTERING INTO A POST-TREATMENT SYSTEM ARRANGED DOWNSTREAM FROM A SYSTEM FOR THE TREATMENT OF SAID GASES

(75) Inventors: Emmanuel Poilane, Arpajon (FR); Pascal Barrillon, Issy les Moulineaux (FR); Olivier Meurisse, Antony (FR); Fabrice Gauvin, Mennecy (FR)

(73) Assignee: Renalt S.A.S., Boulogne Billancourt (FR)

( * ) Notice: Subject to any disclaimer, the term of this patent is extended or adjusted under 35 U.S.C. 154(b) by 200 days.

(21) Appl. No.: 11/718,070

(22) PCT Filed: Oct. 20, 2005

(86) PCT No.: PCT/FR2005/050878

§ 371 (c)(1),
(2), (4) Date: Nov. 30, 2007

(87) PCT Pub. No.: WO2006/045975

PCT Pub. Date: May 4, 2006

(65) Prior Publication Data

US 2009/0133483 A1    May 28, 2009

(51) Int. Cl.
*G01M 15/10* (2006.01)
(52) U.S. Cl. .................................. 73/114.69
(58) Field of Classification Search .............. 73/114.69, 73/114.71, 114.75, 114.76
See application file for complete search history.

(56) References Cited

U.S. PATENT DOCUMENTS 7,219,008 B2 * 5/2007 Barrillon et al. ............ 701/114

FOREIGN PATENT DOCUMENTS

| DE | 198 36 955 | 3/2000 |
|----|------------|--------|
| DE | 100 36 942 | 5/2002 |
| EP | 1 061 241 | 12/2000 |

* cited by examiner

*Primary Examiner*—Eric S McCall
(74) *Attorney, Agent, or Firm*—Oblon, Spivak, McClelland, Maier & Neustadt, L.L.P.

(57) ABSTRACT

A method and device for estimating temperature of gases arising from internal combustion of an engine at the entrance to a system for post-treatment of the gases. The post-treatment system is downstream from a system for treatment of the gases, which may include a nitrogen oxide $NO_x$ trap, an oxidation catalyst, or a 4-way catalyst. The systems connect to each other by a line, wherein the treatment system is considered as the whole of a whole finite number n of fictive elementary reactors $R_i$ that are perfectly agitated and serially connected, wherein the total number n of fictive elementary reactors $R_i$ is determined, in particular as a function of volume of the treatment system, and the fictive elementary reactors $R_i$ are numbered from 1 to n in the gas flow direction along the treatment system. Fictive elementary reactor $R_n$ is the last to be cross-flown by the gases before leaving the treatment system, and the temperature at the post-treatment system entrance downstream from the system for the treatment of the gases is calculated from the temperature inside the last fictive elementary reactor $R_n$.

8 Claims, 2 Drawing Sheets

METHOD AND DEVICE FOR ESTIMATING THE TEMPERATURE OF EXHAUST GASES ENTERING INTO A POST-TREATMENT SYSTEM ARRANGED DOWNSTREAM FROM A SYSTEM FOR THE TREATMENT OF SAID GASES

BACKGROUND OF THE INVENTION

I. Field of the Invention

The present invention relates to a method and a device which in the case of an internal combustion engine, allow the temperature of the exhaust gases entering a post-treatment system positioned downstream of a system for the treatment of said exhaust gases to be modeled (for example, and non-limitingly said treatment system may be an oxidation catalyst, a nitrogen oxides $NO_x$ trap, or a "4-way" catalyst), thus making it possible to dispense with a sensor while at the same time having access to information that is essential for the correct operation of said post-treatment system.

II. Description of Related Art

Various methods for estimating the temperature within a system for treating the gases resulting from internal combustion in an engine (for example within a nitrogen oxides No trap) and installed in the exhaust system of said engine are known, since this parameter does in fact play an important part both in the efficiency of said treatment system and in its aging in particular. These methods are generally based on measuring the temperature of the exhaust gases near said treatment system (upstream or downstream thereof or, in certain cases, measuring twice, upstream and downstream/combined with a calculation based on various types of models.

Document U.S. Pat. No. 5,419,122, for example, thus proposes a method for determining the condition of a catalytic trap, in which method the temperature of the exhaust gases upstream of said trap is measured, combined with the measuring of the temperature of said gases downstream of said trap, to allow the amount of heat transferred between said exhaust gases and the catalyst in said trap to be calculated, the temperature of said catalyst then being deduced from said amount of heat using a conventional model for the transfer of heat by convection within said catalyst.

Such methods do not, however, fully take account of phenomena that arise in transient engine conditions and only partially account for the physico-chemical phenomena that occur within the catalytic trap or even ignore these completely. Now, the exothermal nature of the reactions that take place within said trap together with the thermal inertia of said trap have a not insignificant influence on the thermal condition of said trap and on its temperature: failure to take these factors into consideration may result in a somewhat unreliable estimate of the parameter being studied in models in which, furthermore, the only input data item is a temperature measurement taken outside said trap (which is therefore not particularly representative of the thermal condition within said trap).

Document DE 19836955 sets out a method for calculating the temperature within catalytic traps, in which two treatment systems are placed in series in the exhaust system of an internal combustion engine, and in which said temperature is deduced, by a method of integration, from an energy balance within each of said treatment systems, partially taking into consideration a certain amount of exothermal behavior during operation together with the thermal inertia of said systems.

This method does, however entail the fitting of several temperature sensors to the exhaust system and therefore Droves to be relatively expensive since said sensors have also to be equipped with appropriate connection equipment, thus further increasing the cost. The measurement precision of said sensors may, also, degrade as they experience thermal aging and/or become soiled, and the large number of them used here may lead to significant drifts in the reliability of the results.

BRIEF SUMMARY OF THE INVENTION

It is an object of the present invention, when the exhaust system of an internal combustion engine of a vehicle has, installed within it, a post-treatment system positioned downstream of a system for treating the gases resulting from said internal combustion to propose a model for calculating the temperature of said exhaust gases at the Inlet to said post-treatment system which thus makes it possible to dispense with the fitting of an additional sensor to said exhaust system.

The invention achieves its objective by virtue of a method for estimating the temperature of the gases resulting from internal combustion in an engine at the inlet to a system for the post-treatment of said gases, which system is connected by a pipe to an upstream system for the treatment of said gases, and which is considered for calculation purposes to be a collection of n elementary reactors $(R_i)$ connected in series, of which the total number n depends on the volume of said treatment system and of which the nth $(R_n)$ is the last through which said gases pass before leaving said treatment system (10), characterized in that said temperature $(T_e)$ at the inlet to said post-treatment system (12) is calculated from the temperature $(T_n)$ within the nth elementary imaginary reactor $(R_n)$.

In a preferred embodiment of the invention said temperature at the inlet to said post-treatment system positioned downstream of said treatment system is calculated from said temperature within said nth elementary imaginary reactor using a simple model of thermal convection in a tube.

Alternatively, if the distance between said post-treatment system positioned downstream of said treatment system and said treatment system is short enough, said temperature at the inlet to said post-treatment system positioned downstream of said treatment system is considered to be equal to the temperature within said nth imaginary elementary reactor.

Advantageously, the invention may have one or other of the following features:
  said model for thermal convection in a tube takes account of the physical parameters of the gases (density, heat capacity, dynamic viscosity, thermal conductivity, and the physical parameters of the exhaust system between said treatment system and said post-treatment system positioned downstream of said treatment system (heat capacity of the material of which said exhaust system is made, etc.) so as to determine the convective heat exchanges between the gases and said exhaust system,
  said method according to the invention is combined with suitable processing means within the internal combustion engine electronic management system.

BRIEF DESCRIPTION OF THE DRAWINGS

Other features and advantages of the invention will emerge from reading the description which follows, with reference to the attached drawings in which.

DETAILED DESCRIPTION OF THE INVENTION

Figure 1:
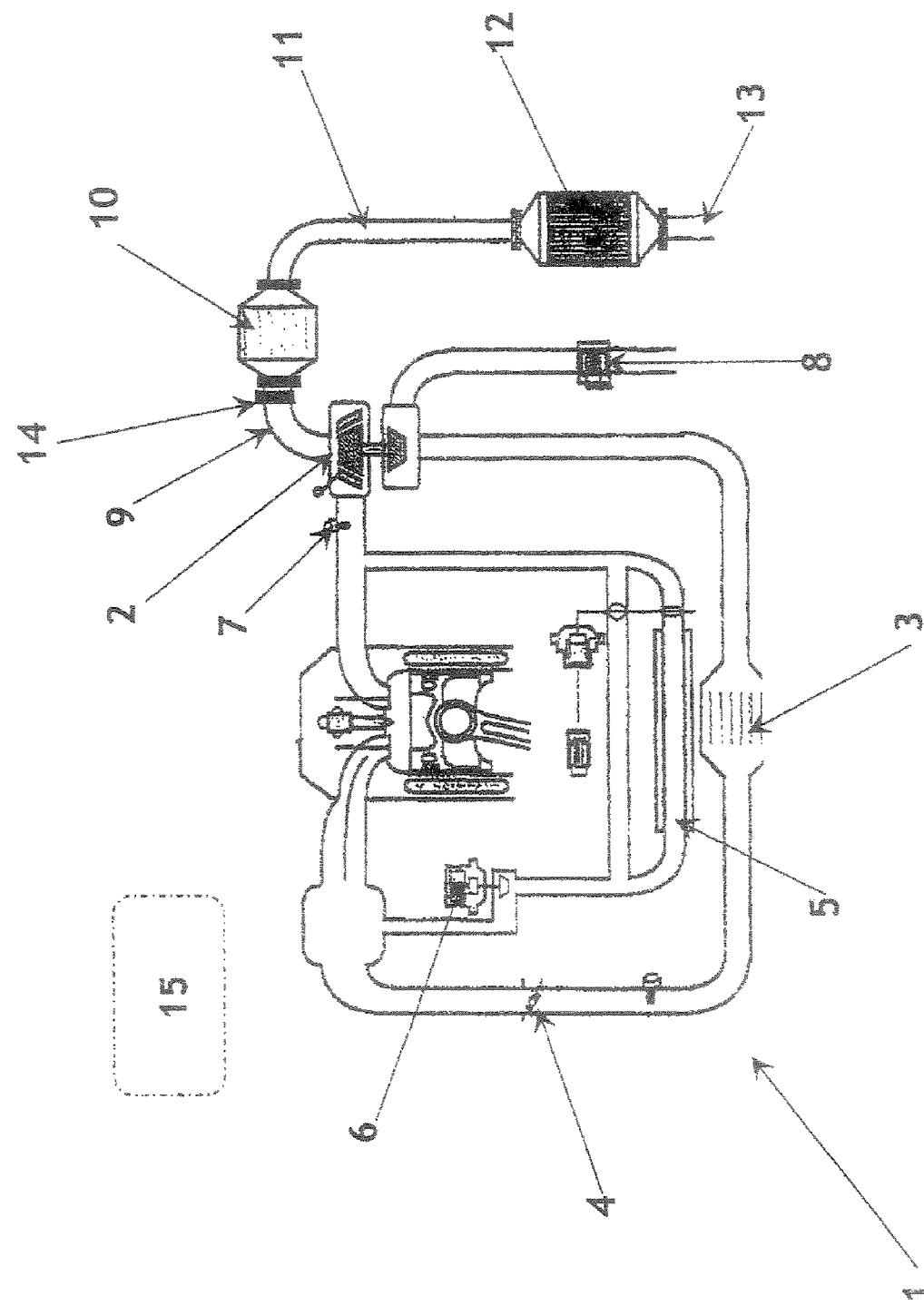
FIG. 1 is a simplified diagram of an internal combustion engine and of its exhaust system including a system for treating the gases resulting from said combustion and a post-treatment system positioned downstream of said treatment system.

FIG. 1 depicts a simplified diagram of an internal combustion engine associated with a turbocharger 2 and comprising, in the conventional way, a charge air cooler 3 coupled to air flaps 4, and an EGR cooler 5 coupled to an EGR valve 6 for partially recirculating and cooling some of the combustion gases. The turbocharger 2 is associated in the conventional way with a temperature probe 7 and with an air inlet flow meter 8. After combustion, the gases are conveyed in a pipe 9 to a first treatment system 10 (for example and nonlimitingly a nitrogen oxides $NO_x$ trap or an oxidation catalyst or a "4-way" catalyst), then, via a pipe 11 placed at the outlet from said treatment system 10, to a post-treatment system 12 and finally, via an appropriate device 13, as far as the vehicle exhaust A temperature probe 14 is placed on the pipe 9, preferably as close as possible to the inlet to said treatment system 10.

All of this is driven via an electronic system 15, said electronic system 15 being, in particular and nonlimitingly, equipped with data processing means for processing the data delivered by the sensors 7, 8 and 14.

Figure 2:
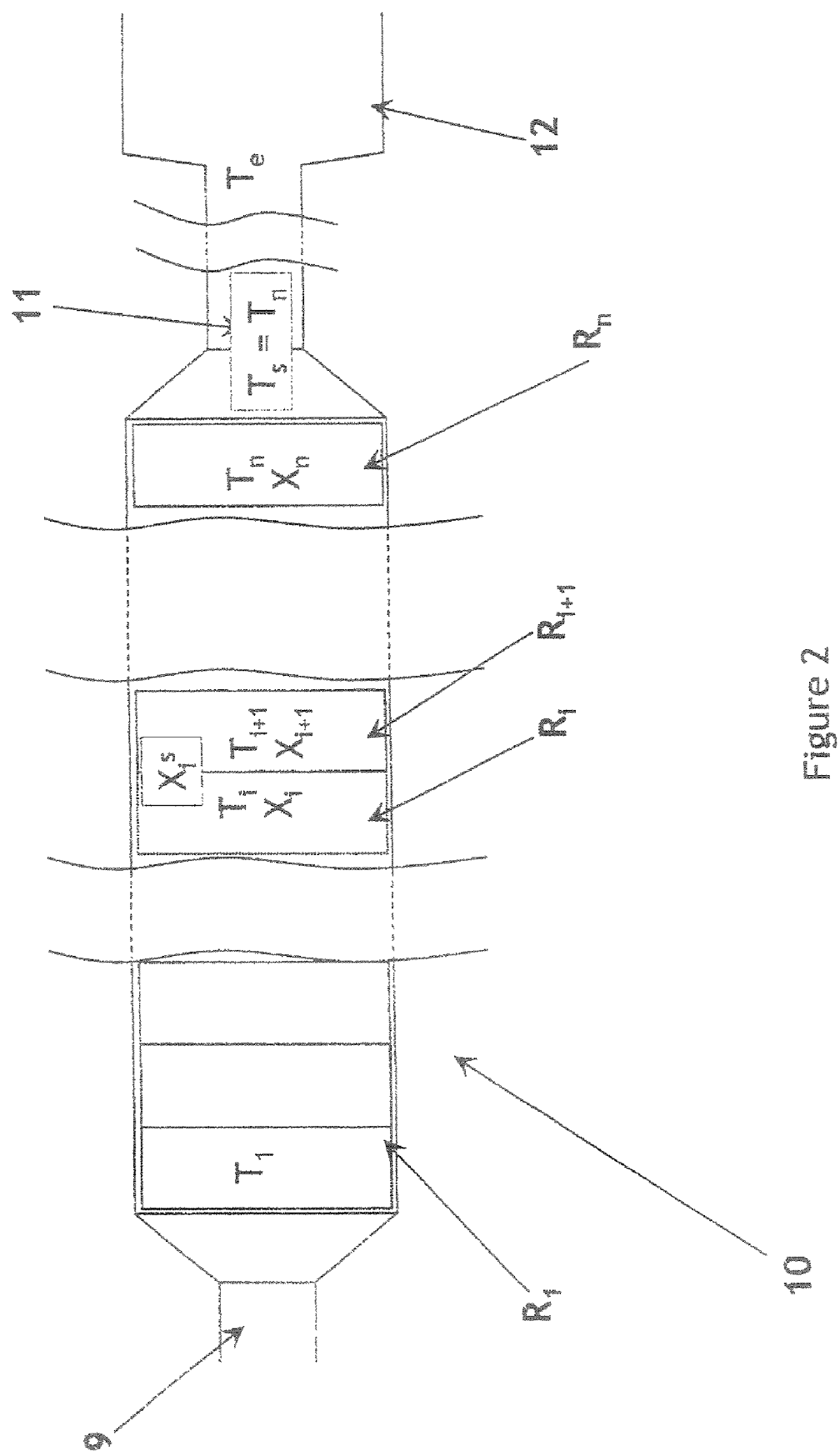
FIG. 2 is a diagram of a system for treating gases.

As FIG. 2 shows, the treatment system 10 may be considered to be a collection of n imaginary elementary reactors $R_i$ Said n imaginary elementary reactors $R_i$ are connected in series and perfectly mixed around so that all the system variables are constant within each of said n imaginary elementary reactors $R_i$: hence, the value $X_i^s$ of the variable X at the outlet from the imaginary elementary reactor $R_i$ is equal to the value $X_i$ of said variable X within said Imaginary elementary reactor $R_i$. By way of example and nonlimitingly, the operating variables considered may be: the temperature, the concentrations of the various products in the gaseous mixture treated within said treatment system 10, the physico-chemical properties of said mixture (viscosity, heat capacity etc.) and the physical properties of the elements that make up said system 10 (thermal conductivity of the materials, etc.).

Said n imaginary elementary reactors $R_i$ are numbered from 1 to n in the direction in which the gases flow through said treatment system 10: the elementary reactor $R_n$ is thus the one which corresponds to the outlet of the gases from said treatment system 10.

For each imaginary elementary reactor $R_i$, the systems of equations for the mass, thermal and energy balances are solved while at the same time taking account of the chemical dynamics of the gaseous mixture passing through said imaginary elementary reactor $R_i$ and the elements of which said imaginary elementary reactor $R_i$ is made. The results obtained for said imaginary elementary reactor $R_i$ are used as input values for the next imaginary elementary reactor $R_{i+1}$ so that a longitudinal profile of the magnitudes considered is gradually built up along the system 10.

The initial values of the magnitudes considered are determined from, for example and nonlimitingly, the information supplied by the sensor 14 or tables or graphs established on the basis of assumptions made as to the composition of the gaseous mixture in particular.

The total number n of imaginary elementary reactors $R_i$ that form the system 10 is defined according to the volume of said system 10, according to the desired precision for the results obtained, and so as not to overburden the system tasked with performing the operations with an excessive computational load.

As mentioned previously each of the n imaginary elementary reactors $R_i$ have the notable property that the system variables therein are constant: as a result, in particular, the value, for example, of the temperature within the last imaginary elementary reactor $R_n$, namely $T_n$, is therefore equal to the value of said temperature at the outlet from said imaginary elementary reactor $R_n$, that is to say at the outlet from said treatment system 10, namely $T_s$.

When the length of the pipe 11 positioned between said treatment system 10 and said post-treatment system 12 is minimal it is possible, in the method according to the invention, to disregard thermal phenomena that occur within said pipe 11: it then follows that the value $T_e$ of the temperature of the gases at the inlet to said post-treatment system 12 is equal to the value $T_s$ of said temperature at the outlet from said treatment system 10 and therefore to the temperature $T_n$ calculated within the imaginary elementary reactor $R_n$, the temperatures $T_n$ and $T_s$ being identical as mentioned before.

When the length of said pipe 11 positioned between said treatment system 10 and said post-treatment system 12 is too great for it to be possible to disregard the thermal phenomena occurring therein, said temperature $T_e$ is calculated, by the method according to the invention, using a simplified model of thermal convection in a tube, the temperature $T_s$ (namely $T_n$) at the outlet from the treatment system 10 being used as the input value for said simplified model of thermal convection in a tube Knowledge of the value of $T_s$ (namely $T_n$) allows access to the physical parameters of the gases passing along said pipe 11 (such as, for example and nonlimitingly: density, heat capacity, dynamic viscosity, thermal conductivity) and to the characteristic magnitudes concerning said pipe 11 (thermal conductivity, for example). It thus becomes possible to determine the coefficients of convective heat exchanges between said gases and said pipe 11 and thereby to calculate said exchanges in order to estimate the temperature $T_e$ of said gases at the inlet to said post-treatment system 12.

The method according to the invention thus makes it possible to dispense with the fitting, on said pipe 11 positioned between said treatment system 10 and said post-treatment system 12, of an additional sensor which, aside from its own cost, would result in the cost of the associated connection equipment and of installing means for processing the signal delivered by said sensor within the electronic system tasked with performing the calculations.

In an additional embodiment of the present invention, the method according to the invention described hereinabove is associated with the means necessary for fitting it and, in particular for installing it within said electronic system 15, thus allowing simplified and real-time management and monitoring of the performance and aging of the systems that process the gases originating from internal combustion in the engine considered.

The invention claimed is

1. A method for estimating temperature of gases resulting from internal combustion in an engine at an inlet to a system for post-treatment of the gases, the post-treatment system is connected by a pipe to an upstream system for treatment of the gases, comprising:

considering, for calculation purposes, the upstream system to be a collection of n elementary reactors connected in series, wherein the number n depends on a volume of the treatment system and the nth elementary reactor is the last elementary reactor through which the gases pass before leaving the upstream system; and calculating the temperature at the inlet to the post-treatment system from the temperature within the nth elementary reactor.

2. The method as claimed in claim 1, wherein the temperature at the inlet to the post-treatment system is calculated from the temperature within the nth elementary reactor using a simple model of thermal convection in a tube.

3. The method as claimed in claim 1, wherein physical parameters of the gases and physical parameters of the pipe are estimated from the temperature so as to determine convective heat exchanges between the gases and the pipe.

4. The method as claimed in claim 1, wherein, when the length of the pipe is short enough, the temperature at the inlet of the post-treatment system is considered to be equal to the temperature within the nth elementary reactor.

5. A device for estimating temperature of gases resulting from internal combustion in an engine at an inlet to a system for post-treatment of the gases positioned downstream of a system for treatment of the gases, the post-treatment system being connected to the treatment system by a pipe, comprising treatment means for application of the method as claimed in claim 1.

6. The device as claimed in claim 5, wherein
the device is installed on a vehicle, and
the temperature of the gases to be determined is a temperature resulting from internal combustion in the engine and treatment in the treatment system.

7. The device as claimed in claim 5, wherein
the device is driven via an electronic management system that manages the internal combustion engine.

8. A device to estimate temperature of gases resulting from internal combustion in an engine comprising:
a treatment system to treat the gases including a collection of n elementary reactors connected in series, wherein the number n depends on a volume of the treatment system and the nth elementary reactor is the last elementary reactor through which the gases pass before leaving the treatment system; and
a post-treatment system to treat the gases positioned downstream of the treatment system, the post-treatment system being connected to the treatment system by a pipe, wherein
the temperature at an inlet to the post-treatment system is calculated from the temperature within the nth elementary reactor.

* * * * *

UNITED STATES PATENT AND TRADEMARK OFFICE
CERTIFICATE OF CORRECTION

PATENT NO. : 7,698,933 B2  Page 1 of 1
APPLICATION NO. : 11/718070
DATED : April 20, 2010
INVENTOR(S) : Poilane et al.

It is certified that error appears in the above-identified patent and that said Letters Patent is hereby corrected as shown below:

On the title page, Item (73), the Assignee's information is incorrect. Item (73) should read:

Item -- (73) Assignee: Renault S.A.S., Boulogne Billancourt (FR) --

Signed and Sealed this

Third Day of August, 2010

David J. Kappos
*Director of the United States Patent and Trademark Office*